United States Patent [19]

Mansutti

[11] Patent Number: 5,001,890
[45] Date of Patent: Mar. 26, 1991

[54] DUPLICATE-CYCLE PACKAGER

[75] Inventor: Franco Mansutti, Feletto Umberto, Italy

[73] Assignee: Casagrande S.p.A., Pordenone, Italy

[21] Appl. No.: 384,442

[22] Filed: Jul. 25, 1989

[51] Int. Cl.⁵ .................... B65B 35/50; B65B 35/58
[52] U.S. Cl. ................................... 53/540; 53/544; 414/791.4
[58] Field of Search ............... 53/244, 247, 537, 540, 53/544; 414/788.3, 791.4, 793.2

[56] References Cited

U.S. PATENT DOCUMENTS

| | | | |
|---|---|---|---|
| 3,957,163 | 5/1976 | Tänzler | 414/791.4 X |
| 4,184,800 | 1/1980 | Uchida et al. | 414/791.4 |
| 4,278,377 | 7/1981 | Elineau | 414/791.4 X |
| 4,392,765 | 7/1983 | Barton et al. | 414/791.4 X |
| 4,419,928 | 12/1983 | Klusmier | 414/793.2 X |
| 4,487,540 | 12/1984 | Buchheit | 414/791.4 X |
| 4,566,833 | 1/1986 | Gigante | 414/791.4 X |
| 4,648,770 | 3/1987 | Berg et al. | 414/791.4 X |

FOREIGN PATENT DOCUMENTS 0233109 2/1986 Fed. Rep. of Germany .... 414/791.4

*Primary Examiner*—Robert L. Spruill
*Assistant Examiner*—Linda Johnson
*Attorney, Agent, or Firm*—Shlesinger, Fitzsimmons & Shlesinger

[57] ABSTRACT

Packager for rolled sections with a duplicate cycle comprising a conveyor (2) of rolled sections, means (4–6) designed to form the layers (3', 3") of rolled sections each having a predetermined number of rolled sections, means (10) designed to pick up a layer (3) of sections from said conveyor (2) and transfer said layer (3) to means (26, 35) of forming packages of sections working with package-removal means (36), said means (10) designed to pick up a layer (3) of sections comprising means (16) of hoisting a layer and means (12) of traversing a layer as well as means (14) designed to pick up and overturn a layer coming from said conveyor (2), said means (10) designed to pick up a layer (3") working transiently with a fixed layer support structure (11), the layers (3) coming from said conveyor (2) being picked up alternately by said traversing means (12) and by said layer overturning means (14), and each layer (3') picked up by said traversing means (12) being deposited on said fixed structure (11) and thereon being placed a layer (3") picked up subsequently by said overturning means (14).

8 Claims, 1 Drawing Sheet

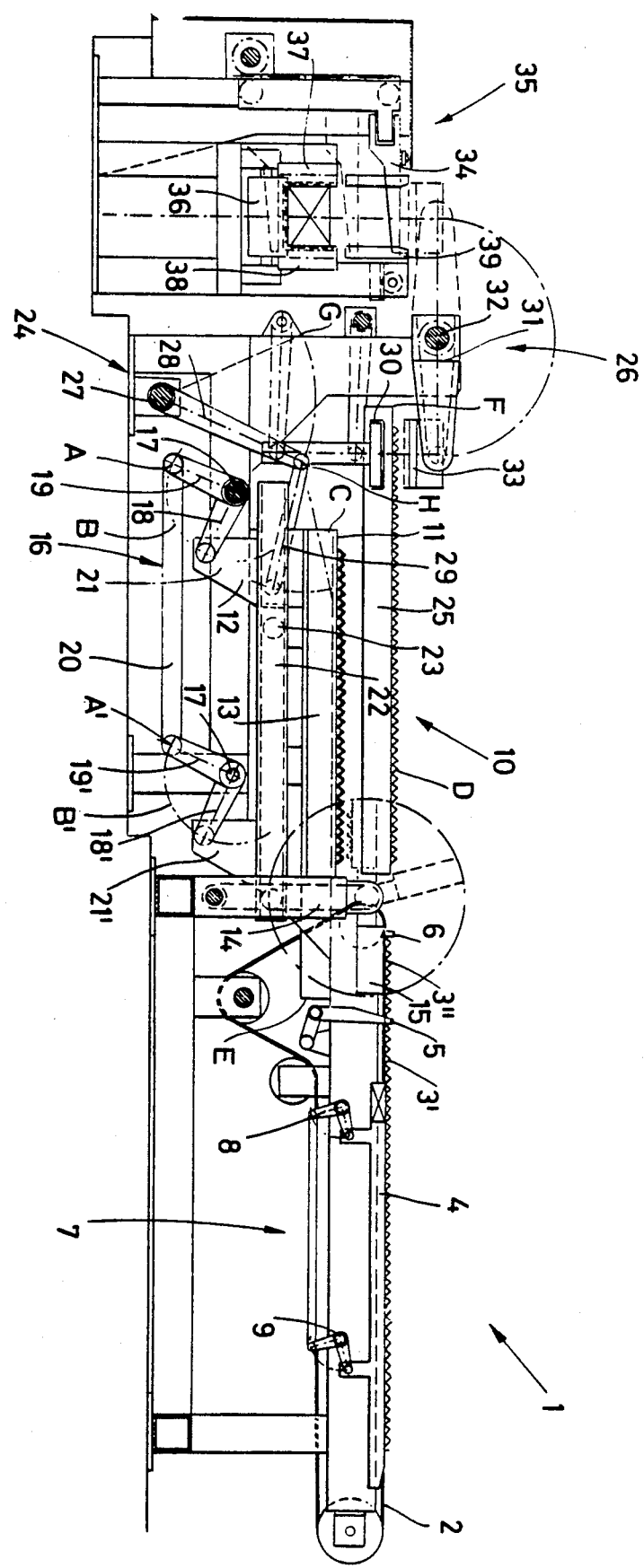

DUPLICATE-CYCLE PACKAGER

DESCRIPTION

The object of the present invention is a packager of coupled sections with duplicate cycle.

The packager in accordance with the invention provides duplication of the cycle consisting of pick-up, coupling and deposit of the sections to drastically reduce packaging time.

Packagers for the formation of packages of sections in alternate and reversed layers wherein one layer calls for "n" sections and the following layer "n−1" sections overturned are known.

The known packagers have a plurality of shortcomings.

A first shortcoming is the fact that the rolled sections in general treated in said packager are subject to dragging which, especially for flat sections or the like, involve problems of quality of the product and quality of the package since the sections tend to overlap in a disorderly manner.

A second shortcoming is the fact that the cycle times are too long for the cycle requirements of modern production outputs.

To obviate these shortcomings the applicant has developed a duplicate-cycle packager in accordance with the structure and characteristics defined hereinafter.

With reference to the annexed figure there will be described below an example of embodiment of the invention.

The packager 1 comprises a conveyer 2 for transferring layers 3', 3'' of rolled sections placed on said conveyor 2 by means not shown in the figure but well known in the art.

Working with said conveyor 2 there are provided means 4 designed to hoist simultaneously a plurality of rolled sections, means 5 for separation of layers comprising a first disappearing retainer and means 6 comprising an adjustable second retainer by means of which a layer 3 is placed in a predetermined position.

The separation means 5 work with the hoisting means 4 to form layers of rolled sections each having a predetermined number of rolled sections.

In the case shown in the figure the layer 3' comprises six sections while the layer 3'' comprises five rolled sections.

Said layers are formed by first raising the disappearing retainer 5.

Next the sections which have advanced on the conveyor 2 are blocked at the level of said retainer 5 and arrange themselves in a layer of adjacent sections.

Once the preset number of sections is reached, the hoisting means 4 made up of a series of blades parallel to the conveyor 2 are hoisted by an appropriate mechanism 7 which, in the case shown in the figure, consists of levers 8 rotating simultaneously around shafts 9.

Said blades, in hoisting the advancing sections, block their movement toward the retainer 5.

The latter is then lowered and the layer thus formed advances to the second disappearing retainer 6.

Said retainer 6 defines a fixed position for withdrawal of layers 3 of rolled sections by a device 10 for the formation and transfer of a double layer.

Said device 10 comprises essentially three parts, i.e. a series of fixed blades 11, a hoist 12 with a longitudinally traversing carriage 13 and a turning device 14 equipped with magnets 15 and designed to overturn and transfer a layer 3 of rolled sections.

The hoist 12 has a mechanism 16 for hoisting layers similar to the abovedescribed mechanism 7.

It comprises a pair of rotating shafts 17, 17' on each of which there are keyed levers 18, 19 and 18', 19' respectively.

The levers 19, 19' are connected together at one end by means of a drive shaft 20 while the levers 18, 18' are connected to the supports 21, 21' respectively of the hoist 12.

In the example shown in the figure the shaft 17 is motorized and transmits to the levers 18, 18', 19, 19' a rotating movement between points A, B and A', B' respectively.

The hoist is also equipped with a guide rail 22 between which there moves parallel to the conveyor 2 a carriage 13 mounted on wheels 23 whose movement is controlled by a traversing mechanism 24 which will be described in greater detail below.

The carriage 13 also comprises blades 25 for hoisting and transferring layers of sections 3.

In accordance with the invention, with the rotation movement A-B or A'-B' of the levers 19, 19' there is a corresponding and equal rotation of the levers 18, 18' and also a hoisting of the carriage 12 between a position C below the level of the fixed blades 11 and a position D above the level of the conveyor 2.

In addition the carriage 12 can be traversed longitudinally between a position E wherein one of its ends is designed to pick up a layer 3 from the conveyor 2 and a position F wherein its other end is designed to deliver a layer 3 of sections to a package formation device 26 which will be described in greater detail below.

Operation of the device 10 for formation and transfer of a double layer is as follows. Supposing that there is picked up a layer 3'' consisting of six rolled sections located on the conveyor 2 opposite the retainer 6, the carriage 12 is first traversed to its end position E.

This movement takes place thanks to the traversing mechanism 24 which comprises in general a shaft 27 on which is keyed at one end a lever 28 and at the other end of which is connected another lever 29 in turn connected to the carriage 12.

As can be seen in the figure, a rotation of the motorized shaft 27 causes shifting of the lever 28 between points G and H and a resulting movement of the carriage 12.

Next the shaft 17 is rotated and the levers 25 of the carriage 12 are raised from level C to level D, picking up the layer 3 of sections lying on the conveyor 2 near the pin 6.

Then the carriage 12 is traversed in the opposite direction to the position F and lowered to level C.

This causes deposit of the layer 3 on the fixed blades 11.

During the traversing movement of the carriage between the positions E and F a new layer 3' of five sections takes a position near the retainer 6.

Said layer is taken from below by the magnet 15 belonging to the turning device 15 which, by performing a counterclockwise rotation of 180 degrees, overturns the layer and deposits it on the layer 3'' previously formed and lying on the fixed blades 11.

Next the magnet 15 rotates in the opposite (clockwise) direction and is arranged in a nearly vertical position.

The cycle is then resumed and the carriage traverses to position E.

The subsequent hoisting of the carriage 12 between positions C and D causes hoisting by the conveyor 2 of another layer 3" of six sections and simultaneous hoisting of the double layer of sections lying on the fixed blades 11.

The subsequent traversing of the carriage 12 between end position E and the other end position F causes transfer of said double layer to the package formation device 26.

Simultaneously with said traversing there is performed a counterclockwise rotation of the magnet 15 in an approximately 270-degree arc.

Said rotation causes positioning of said magnet 15 below the conveyor 2 in a position designed to pick up another layer 3' of five sections to be overturned.

Depending on the length of the blades 25 of the carriage 12 the cycle can be repeated several times until a double layer 3 is arranged on said blades opposite the package forming device 26.

Said device 26 comprises essentially a hoist 30 and an arm 31 turning around a shaft 32.

Said arm 31 bears at its end a magnet 33.

Said magnet 33 maintains continuously a horizontal position during rotation of the turning arm 31 thanks to a chain drive with sprocket connected to the magnet 33 and rim connected to the shaft 32.

The hoist 30 takes a double layer from the blades 25 and delivers it to the magnet 33.

The arm 31 then makes a 180-degree rotation and the double layer is then delivered onto the disappearing arms 34 of a package former 35.

Said arms are vertically traversable and are designed to deposit a package of double layers of sections on a conveyor 36 provided with fixed first vertical rollers 37, second vertical rollers 38 and side boards 39 adjustable depending on the width of the package of sections.

By means of an adequate transmission ratio of the sprocket, chain and rim mechanism rotation of the device 26 can be synchronized with the movement of the carriage 12.

A continuous formation of packages can thus be made, eliminating idle time and achieving the objects of the invention.

I claim:

1. Packager of rolled sections with a duplicate cycle comprising,
    a conveyor (2) for feeding rolled sections one after the other to a pick up station for delivery to a package formation device (26),
    means (4-6) for repeatedly forming successive groups of said rolled sections into layers of rolled sections at said pick up station, each successive such layer having therein a predetermined number of rolled sections,
    pick up and transfer means (10) for picking up successive layers of said sections from said pick up station, stacking successive layers in pairs, one on top of the next, and transferring the stacked pairs of layers to said package formation device, and removal means (36) for removing a completed package from said package formation device,
    said pick up and transfer means comprising,
    a stationary support for supporting the single layers and the stacked pairs of layers,
    layer hoisting and traversing means for intermittently picking up one layer of each successive pair thereof from said pick up station and depositing said one layer on said stationary support and for picking up stacked pairs of layers from said stationary support and depositing said pairs at said package formation device, and
    layer overturning means (14) for picking up the other layer of each successive pair thereof from said pick up station and overturning said other layer onto said one layer at said stationary support whereby the layers of rolled sections coming from said conveyor are picked up alternately by said layer hoisting and traversing means and by said layer overturning means, and each layer picked up by said layer hoisting and traversing means is deposited on said stationary support, and thereon there is placed a layer picked up subsequently from said pick up station by said overturning means.

2. Packager in accordance with claim 1 characterized in that said layer hoisting and traversing means comprises a carriage (12) movable on guides (22) between first and second positions adjacent said pick-up station and said stationary support, respectively.

3. Packager in accordance with claim 2 characterized in that said carriage (12) has thereon blades (25) for picking up said layers from said pick-up station, when said carriage is in its first position, and for depositing said layers on said stationary support when said carriage is in its second position.

4. Packager in accordance with claim 2 or 3 characterized in that said pick up and transfer means further comprises means for moving said carriage between said second position and a third position for delivering said pairs of layers from said stationary support to said package formation device (26).

5. Packager in accordance with claim 3 characterized in that means is provided for moving said blades (25) between a first level below the level of said stationary support and a second level above the level of said conveyor (2).

6. Packager in accordance with claim 4 characterized in that said package formation device (26) comprises a hoist (30) for picking up a stacked pair of said layers from said carriage (12) when said carriage is in its third position, and a magnet (33) connected to an arm (31) turning around a shaft (32), said magnet (33) being operative for delivering a stacked pair of said layers to said package formation device (35).

7. Packager in accordance with any one of claims 1 to 3 or 5 characterized in that said layer over-turning means comprises an arm turning around a shaft and bearing a magnet (15).

8. Packager in accordance with any one of claims 1 to 3 or 5 characterized in that said means for forming successive groups of said sections into layers at said pick-up station comprises at least one adjustable disappearing retainer (6) situated near one end of said conveyor (2) and at least one other disappearing retainer (5) spaced a predetermined distance inwardly from said one end of said conveyor.

* * * * *

UNITED STATES PATENT AND TRADEMARK OFFICE
CERTIFICATE OF CORRECTION

PATENT NO. : 5,001,890
DATED : March 26, 1991
INVENTOR(S) : Franco Mansutti

It is certified that error appears in the above-identified patent and that said Letters Patent is hereby corrected as shown below:

On the Title page, after paragraph, item [22] insert the following paragraph: item [30], Foreign Application Priority Data, Aug. 2, 1988 (IT) Italy-- 21621 A/88--.

Signed and Sealed this

Twenty-fifth Day of May, 1993

Attest:

MICHAEL K. KIRK

Attesting Officer

Acting Commissioner of Patents and Trademarks